United States Patent
Obata et al.

(10) Patent No.: US 6,324,454 B1
(45) Date of Patent: Nov. 27, 2001

(54) ACTIVATION CONTROL APPARATUS OF OCCUPANT SAFETY

(75) Inventors: Yuujiro Obata, Inuyama; Motomi Iyoda, Seto, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/493,032

(22) Filed: Jan. 28, 2000

(30) Foreign Application Priority Data

Feb. 1, 1999 (JP) .................................................. 11-024045

(51) Int. Cl.$^7$ ................................ G05D 1/00; G06F 7/00
(52) U.S. Cl. ............................ 701/45; 280/734; 280/735; 180/232; 180/271; 340/903; 340/435
(58) Field of Search ...................... 701/45, 301; 280/734, 280/735, 728.1; 180/232, 271; 340/436, 438, 903, 435

(56) References Cited

U.S. PATENT DOCUMENTS

| | | |
|---|---|---|
| Re. 36,122 | 3/1999 | Mattes et al. . |
| 5,014,810 | 5/1991 | Mattes et al. . |
| 5,407,228 | 4/1995 | Shibata et al. . |
| 5,483,447 * | 1/1996 | Jeenicke et al. . |
| 5,496,979 | 3/1996 | Behr . |
| 5,559,697 | 9/1996 | Wang . |
| 5,668,720 * | 9/1997 | Takahashi et al. .................... 180/282 |
| 5,732,374 | 3/1998 | Ohm . |
| 5,737,224 * | 4/1998 | Jeenicke et al. ........................ 701/45 |
| 5,740,041 | 4/1998 | Iyoda . |
| 5,770,997 * | 6/1998 | Kleinberg et al. .................... 340/438 |
| 5,785,347 | 7/1998 | Adolph et al. . |
| 5,787,377 * | 7/1998 | Watanabe et al. ...................... 701/45 |
| 5,815,393 * | 9/1998 | Chae .................................... 180/282 |
| 5,914,653 * | 6/1999 | Takeuchi et al. ..................... 340/436 |
| 5,967,548 * | 10/1999 | Kozyreff ............................... 280/735 |
| 5,995,892 * | 11/1999 | Kiribayashi et al. .................... 701/45 |
| 6,007,094 * | 12/1999 | Hosoda ................................ 280/735 |
| 6,014,602 * | 1/2000 | Kithil et al. ............................ 701/45 |
| 6,020,812 * | 2/2000 | Thompson et al. .................... 340/438 |
| 6,116,638 * | 9/2000 | Hosoda ................................ 280/735 |
| 6,123,357 * | 9/2000 | Hosoda et al. ..................... 280/730.2 |
| 6,125,313 * | 9/2000 | Watanabe et al. ...................... 701/45 |
| 6,170,864 * | 1/2001 | Fujita et al. .......................... 280/735 |
| 6,181,998 * | 1/2001 | Kanameda et al. ..................... 701/45 |
| 6,196,578 * | 3/2001 | Iyoda .................................. 280/735 |

FOREIGN PATENT DOCUMENTS

| | | |
|---|---|---|
| 197 51 336 | 6/1998 | (DE) . |
| 197 40 019 | 3/1999 | (DE) . |
| 2 293 681 | 4/1996 | (GB) . |
| 4-72060 | 6/1992 | (JP) . |
| 5-38998 | 2/1993 | (JP) . |
| 5-213150 | 8/1993 | (JP) . |
| 5-286407 | 11/1993 | (JP) . |
| 5-305855 | 11/1993 | (JP) . |
| 6-321051 | 11/1994 | (JP) . |
| 6-340244 | 12/1994 | (JP) . |
| 7-96816 | 4/1995 | (JP) . |
| 7-309197 | 11/1995 | (JP) . |
| 10-29494 | 2/1998 | (JP) . |
| 10-86788 | 4/1998 | (JP) . |
| 10-152014 | 6/1998 | (JP) . |
| 10-166993 | 6/1998 | (JP) . |
| 10-287203 | 10/1998 | (JP) . |

* cited by examiner

*Primary Examiner*—William A. Cuchlinski, Jr.
*Assistant Examiner*—Olga Hernandez
(74) *Attorney, Agent, or Firm*—Kenyon & Kenyon (57) ABSTRACT

An activation control apparatus of an occupant safety system is an apparatus for controlling activation of airbag system 36 mounted on a vehicle in the event of the vehicle colliding with an obstacle, which has front sensors 30A, 30B mounted in the vicinity of a colliding part of the vehicle, a floor sensor 32 mounted behind the front sensors in the vehicle, and an output control 42 for controlling an output of inflators 36A, 36B on the occasion of activation of the airbag system, based on values detected by the front sensors and floor sensor.

11 Claims, 9 Drawing Sheets

FRONT SENSOR 30A

Fig.8B

FRONT SENSOR 30B

ACTIVATION CONTROL APPARATUS OF OCCUPANT SAFETY

BACKGROUND OF THE INVENTION

1. Field of the Invention

The present invention relates to an activation control apparatus of an occupant safety system for controlling activation of the occupant safety system which provides protection for vehicle occupants in the event of a vehicle collision.

2. Related Background Art

The vehicles now available are often equipped with an airbag system for providing the protection for vehicle occupants in the event of a vehicle collision. This airbag system is provided with a device for controlling output of an inflator, based on the magnitude of colliding speed (reference is made to Japanese Patent Application Laid-Open No. 10-29494). The airbag system is designed to compute the collision speed based on the integral and derivative of acceleration detected by acceleration sensors and control the output of the inflator, based on this collision speed.

SUMMARY OF THE INVENTION

The airbag system described above had a delay in detection of the acceleration or the collision speed, because there was a limit to placement of the acceleration sensors in close vicinity of colliding part and impact upon collision became hard to be transmitted to the acceleration sensors if placed far from the colliding part.

An object of the present invention is to implement accurate judgment of a type of collision by accurately detecting the impact upon collision and optimize the output of the inflator of the occupant safety system in accordance with the type of collision.

An activation control apparatus of an occupant safety system according to the present invention is an activation control apparatus for controlling activation of the occupant safety system mounted on a vehicle in the event that the vehicle collides with an obstacle, the activation control apparatus comprising first impact detecting means mounted in the vicinity of a colliding part of the vehicle, second impact detecting means mounted behind the first impact detecting means in the vehicle, and output control means for controlling an output value of an inflator on the occasion of activation of the occupant safety system, based on values detected by the first impact detecting means and the second impact detecting means.

The output value of the inflator herein can be a gas ejection power of the inflator or a gas ejection amount of the inflator per second. The phase "controlling an output value of an inflator" means adjusting the output to an appropriate value in an adjustable range in the case of the inflator that permits stepless adjustment of the gas ejection power or ejection amount, or adjusting the output of the inflator to either a high output or a low output in the case of the inflator that permits two-step adjustment of the gas ejection power or ejection amount.

Since this activation control apparatus of the occupant safety system is constructed to control the output value of the inflator on the occasion of activation of the occupant safety system by the output control means, based on the values detected by the first impact detecting means and the second impact detecting means, i.e., based on the values detected by the detecting means disposed at the positions different from each other, it can activate the occupant safety system at the optimal output according to severity of collision.

Figure 4:
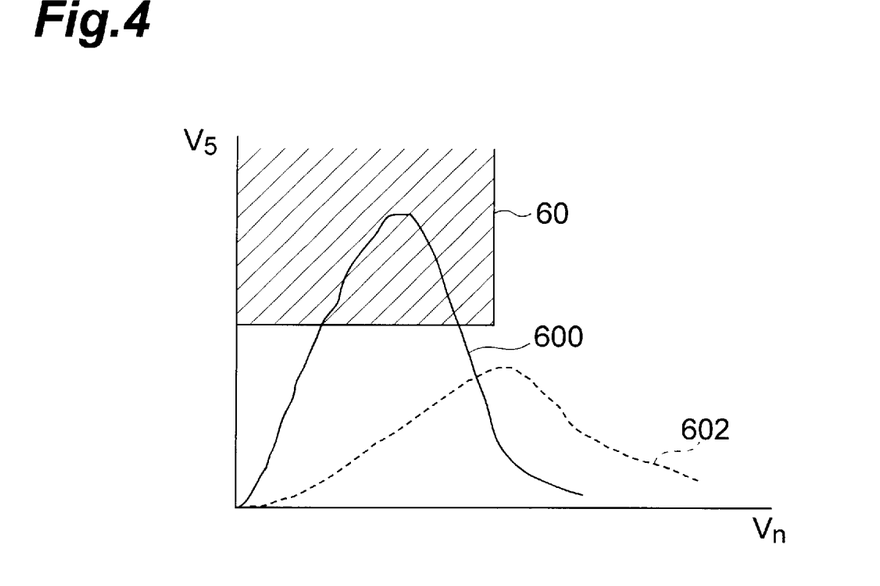
FIG. 4 is a diagram to show an output decision map used in the activation control apparatus of the airbag system according to the first embodiment.
Figure 8A:
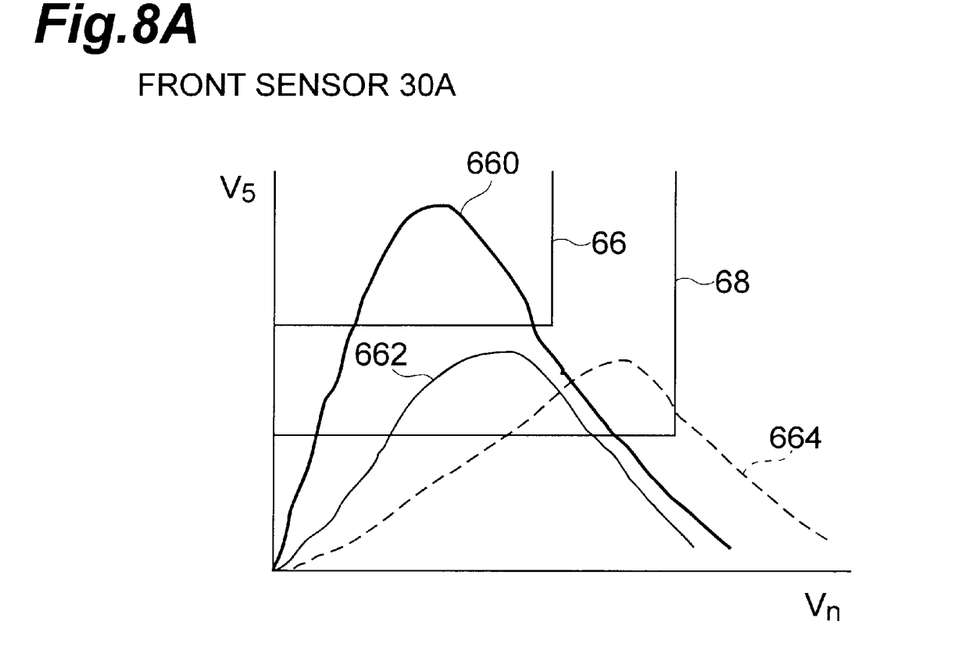
FIG. 8A is a diagram to show the output decision map used in the activation control apparatus of the airbag system according to the third embodiment.
Figure 8B:
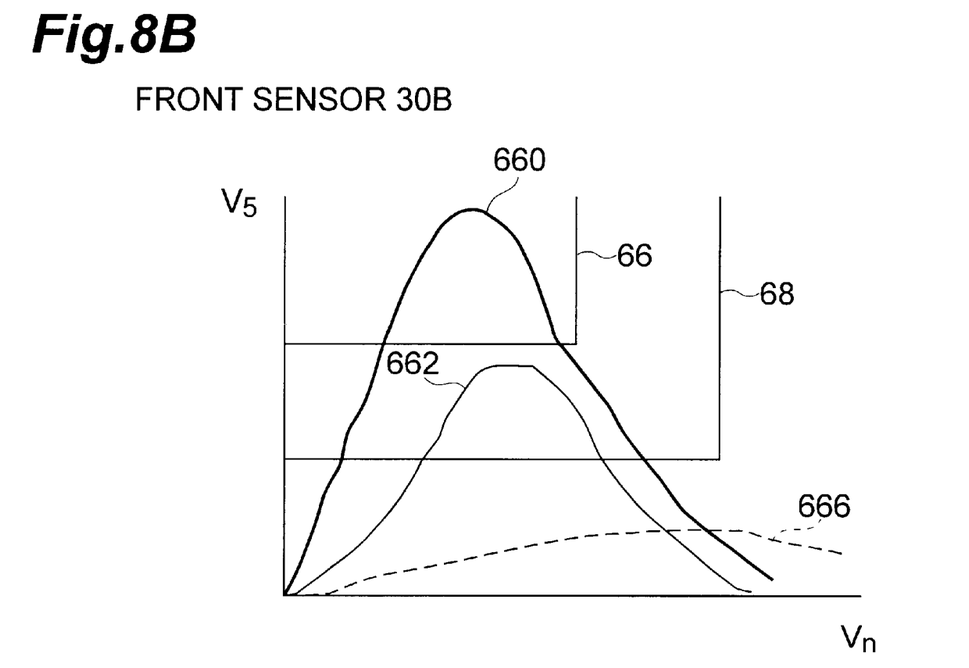
FIG. 8B is a diagram to show the output decision map used in the activation control apparatus of the airbag system according to the third embodiment.
Figure 11:
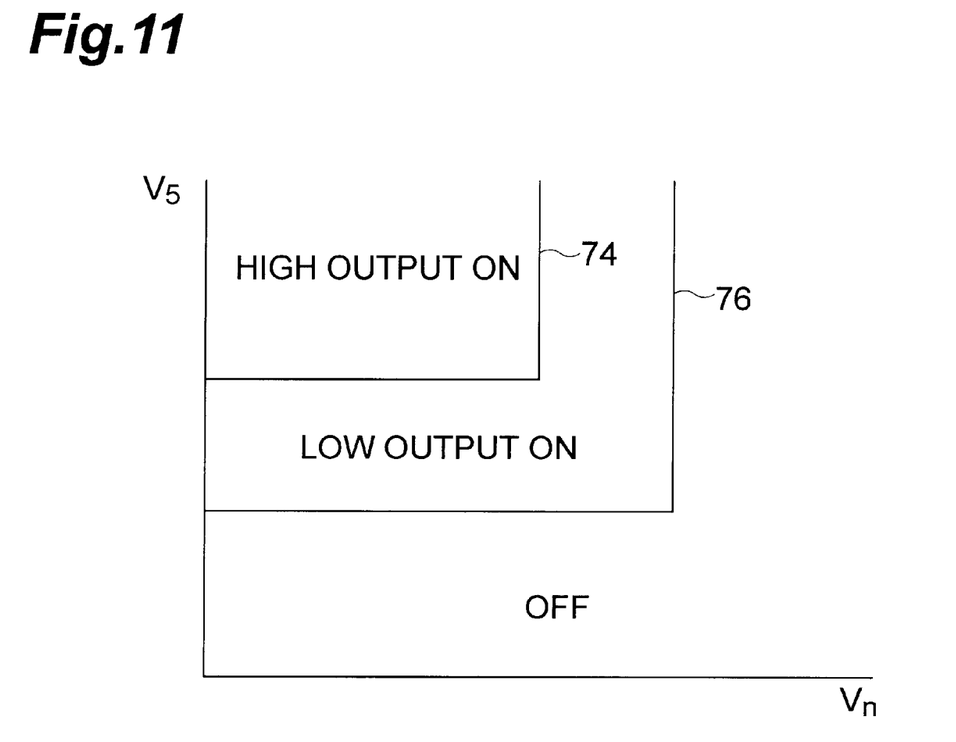
FIG. 11 is a diagram to show an output decision and activation determination map used in the activation control apparatus of the airbag system according to the fourth embodiment.

The activation control apparatus of the occupant safety system is also characterized in that when an integral of the value detected by the second impact detecting means is in a range smaller than a second predetermined value, which is, for example, the right edge of threshold 60 of FIG. 4, threshold 66 of Figs. 8A and 8B, or threshold 74 of FIG. 11, and when an integral of the value detected by the first impact detecting means is greater than a first predetermined value, which is, for example, the lower edge of the threshold 60 of FIG. 4, threshold 66 of FIGS. 8A and 8B or threshold 74 of FIG. 11, the output control means controls the output value of the inflator to a value greater than when the integral of the value detected by the second impact detecting means is in the range smaller than the second predetermined value and when the integral of the value detected by the first impact detecting means is smaller than the first predetermined value.

Figure 7:
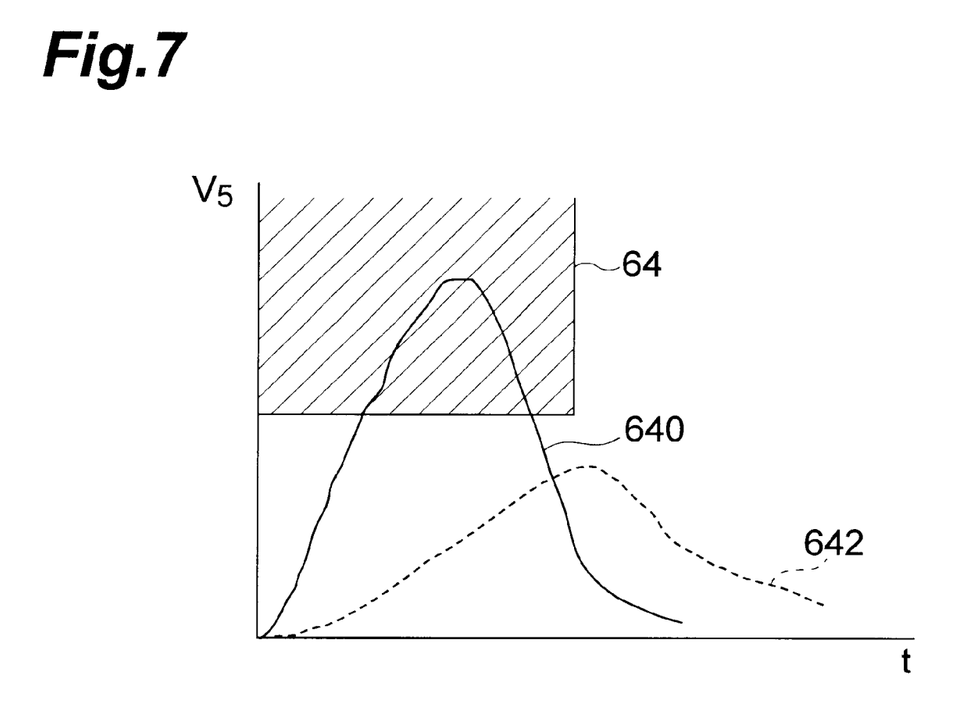
FIG. 7 is a diagram to show the output decision map used in the activation control apparatus of the airbag system according to the second embodiment.

The activation control apparatus of the occupant safety system is also characterized by provision of collision time detecting means for detecting a time of the collision of the vehicle and in that when a time from the time of the collision detected by the collision time detecting means is shorter than a third predetermined value, which is, for example, the right edge of threshold 64 of FIG. 7, and when the integral of the value detected by the first impact detecting means is greater than the first predetermined value, the output control means controls the output value of the inflator to a value larger than when the time from the time of the collision detected by the collision time detecting means is shorter than the third predetermined value and when the integral of the value detected by the first impact detecting means is smaller than the first predetermined value.

At the event of a high-speed collision, the activation control apparatus of the occupant safety system can recognize the collision as a high-speed collision, because great impact occurs or the integral of the value detected by the first impact detecting means becomes greater than the predetermined value in the initial stage of the collision, i.e., while the integral of the value detected by the second impact detecting means is smaller than the predetermined value or while the time from the time of the collision detected by the collision time detecting means is shorter than the predetermined time. Therefore, the output of the inflator can be made appropriate based on this recognition result.

The activation control apparatus of the occupant safety system is also characterized in that the first detecting means is comprised of left front detecting means mounted in the left front part of the vehicle and right front detecting means mounted in the right front part of the vehicle and in that the output control means controls the output value of the inflator, based on values detected by the left front detecting means and right front detecting means.

The activation control apparatus of the occupant safety system is also characterized in that when either one of a value computed based on the value detected by the left front detecting means and the value detected by the second impact detecting means and a value computed based on the value detected by the right front detecting means and the value detected by the second impact detecting means is over a predetermined threshold, which is, for example, the lower edge of threshold 68 of FIGS. 8A and 8B or threshold 76 of FIG. 11, smaller than the first predetermined value and when the other is not over the predetermined threshold, the output control means controls the output value of the inflator to a value larger than when the both of the value computed based on the value detected by the left front detecting means and the value detected by the second impact detecting means and the value computed based on the value detected by the right front detecting means and the value detected by the second impact detecting means, are over the predetermined threshold smaller than the first predetermined value.

This activation control apparatus of the occupant safety system can accurately discriminate a low-speed frontal collision and a high-speed irregular collision such as a high-speed offset collision or the like from each other and the output of the inflator can be controlled based on this discrimination result.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The activation control apparatus of the occupant safety system according to the first embodiment of the present invention will be described by reference to FIG. 1 to FIG. 5.

Figure 1:
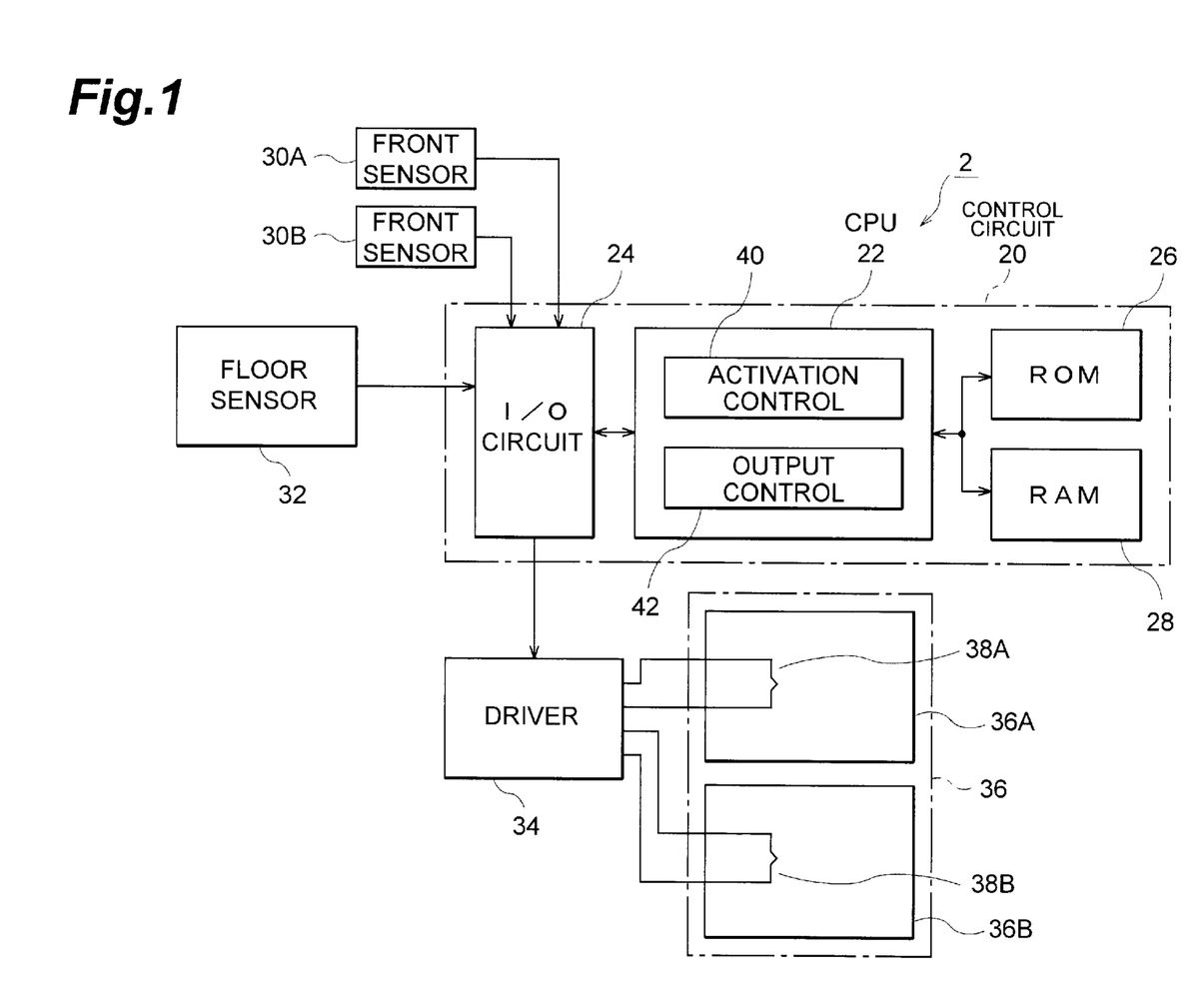
FIG. 1 is a block structural diagram of the activation control apparatus of the airbag system according to the first embodiment.

As illustrated in FIG. 1, the activation control apparatus 2 of the airbag system is a device for controlling the activation of the airbag system 36 and is mainly comprised of a control circuit 20, front sensors (first impact detecting means) 30A, 30B, a floor sensor (second impact detecting means) 32, and a driving circuit 34.

Among these, the front sensors 30A, 30B are electronic sensors for detecting the magnitude of impact exerted on the vehicle, which are mounted in the front part of the vehicle, i.e., usually in the vicinity of the colliding part of the vehicle.

Specifically, they detect the deceleration on the vehicle and output a signal G'(t) corresponding to the deceleration. The floor sensor 32 is a so-called acceleration sensor for measuring the impact exerted on the vehicle and transmitted through the vehicle body. Specifically, it detects the deceleration exerted in the longitudinal direction on the vehicle as occasion arises, and outputs a signal G(t) corresponding to its detecting value (deceleration).

The control circuit 20 incorporates a central processing unit (CPU) 22, an input/output circuit (I/O circuit) 24, a read only memory (ROM) 26, and a random access memory (RAM) 28, and these components are connected via a bus. Among them, the CPU 22 executes control of activation of the airbag system 36 according to programs etc. stored in the ROM 26. The RAM 28 is a memory for storing data obtained by signals from the front sensors 30A, 30B and the floor sensor 32, the result of computation by the CPU 22, based thereon, and so on. Further, the I/O circuit 24 is a circuit for input of the signals from the front sensors 30A, 30B and from the floor sensor 32, for output of an activation signal to the driving circuit 34, and so on.

The CPU 22 functions as an activation control 40 for comparing a value obtained based on the value detected by the floor sensor 32 with a predetermined threshold and for controlling the activation of the airbag system 36, based on the result of the comparison, and as an output control 42 for controlling an actuation output of the airbag system 36, based on the values detected by the front sensors 30A, 30B and the value detected by the floor sensor 32.

The driving circuit 34 is a circuit for energizing squibs 38A, 38B of inflators 36A, 36B in the airbag system 36 in response to the activation signal from the control circuit 20 to fire a gas generator. The airbag system 36 is further provided with the gas generator (not illustrated) fired by the squibs 38A, 38B, and a bag (not illustrated) inflated by evolving gas, in addition to the squibs 38A, 38B of firing units.

Figure 2:
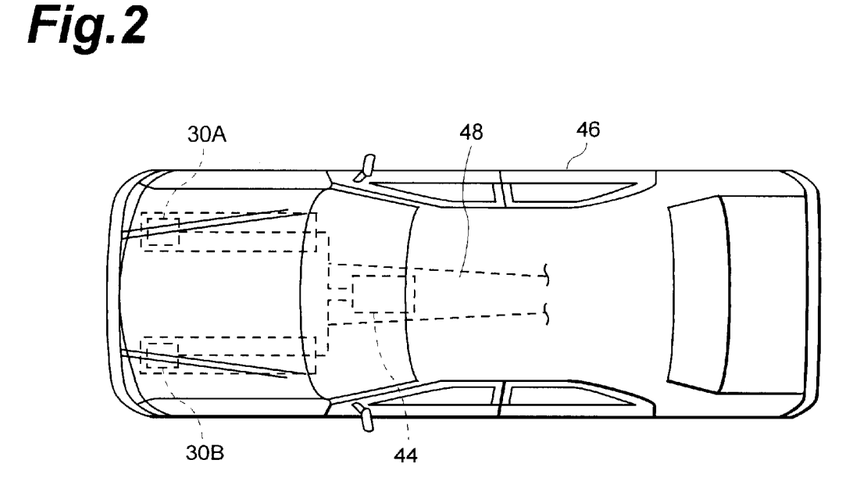
FIG. 2 is a diagram for explaining an on-vehicle state of front sensors etc. of the airbag system according to the first embodiment.

Among these components, the control circuit 20, the floor sensor 32, and the driving circuit 34 are housed in an ECU (electronic control unit) 44 illustrated in FIG. 2, which is mounted on a floor tunnel 48 approximately in the center in the vehicle 46. The front sensor 30A is disposed in the front part of the vehicle 46 right obliquely ahead of the floor sensor 32 in the ECU 44, while the front sensor 30B in the front part of the vehicle 46 left obliquely ahead of the floor sensor 32.

Figure 3:
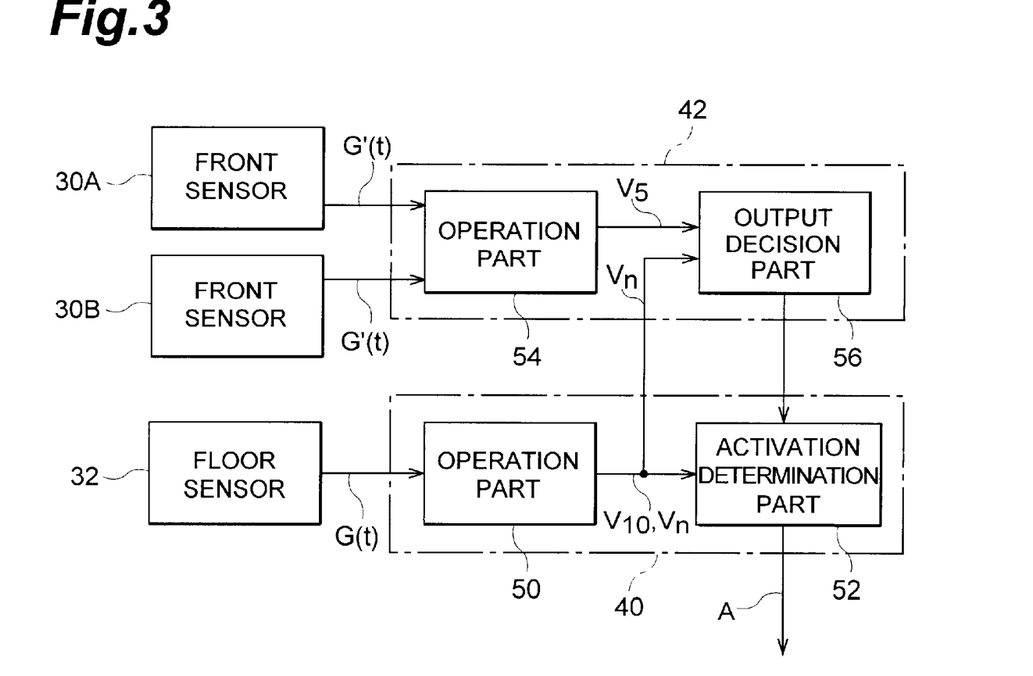
FIG. 3 is a detailed block diagram of activation control and output control in the activation control apparatus of the airbag system according to the first embodiment.

Next, the control of activation of the airbag system carried out in the CPU 22 will be described. As illustrated in FIG. 3, the activation control 40 in the CPU 22 has an operation part 50 and an activation determination part 52. The floor sensor 32 measures the deceleration exerted in the longitudinal direction on the vehicle 46 as occasion arises, and outputs the signal G(t) indicating the deceleration. The operation part 50 of the activation control 40 executes predetermined operations with the deceleration G(t) outputted from the floor sensor 32, i.e., the operations according to Eq. 1 and Eq. 2, thereby obtaining operation results $V_{10}$, $V_n$. Here $V_{10}$ is an interval integral of the deceleration G(t) every interval of 10 ms in a period from the time of occurrence of collision to the end of collision, and $V_n$ is an integral of the deceleration G(t) over the time period from the time of occurrence of collision to the end of collision (n is the time of about 100 ms). Namely, $V_n$ is a speed change (decelerating speed) from the time of occurrence of collision.

$$V_{10} = \int_{t-10ms}^{t} G(t)\,dt \qquad [\text{Eq. 1}]$$

G(t): output of floor sensor $$V_n = \int G(t)\,dt \qquad [\text{Eq. 2}]$$

G(t): output of floor sensor

The output control 42 has an operation part 54 and an output decision part 56. Each of the front sensors 30A, 30B outputs the signal G'(t) corresponding to their detecting value (deceleration). The operation part 54 of the output control 42 executes a predetermined operation with each deceleration G'(t) outputted from the front sensor 30A or 30B, i.e., the operation according to Eq. 3, thereby obtaining an operation result $V_5$. Here $V_5$ is an interval integral of the deceleration G'(t) every interval of 5 ms in the period from the time of occurrence of collision to the end of collision.

$$V_5 = \int_{t-5ms}^{t} G'(t)\,dt \qquad [\text{Eq. 3}]$$

G'(t): output of front sensor

Here the larger out of the operation result $V_5$ based on the deceleration G'(t) outputted from the front sensor 30A and the operation result $V_5$ based on the deceleration G'(t) outputted from the front sensor 30B is supplied to the output decision part 56. The operation result $V_n$ obtained by the operation part 50 of the activation control 40 is also supplied to the output decision part 56.

The output decision part 56 stores an output decision map having an output decision threshold 60 as illustrated in FIG. 4. This output decision map is a plot of the operation result $V_n$ on the axis of abscissas and the operation result $V_5$ on the axis of ordinates. The output decision part 56 compares a value defined by the operation results $V_5$, $V_n$ with the output decision threshold 60 of the output decision map and outputs a signal indicating that the output of the inflators should be high, to the activation determination part 52 when the value defined by the operation results $V_5$, $V_n$ is over the output decision threshold 60. When the value defined by the operation results $V_5$, $V_n$ is not over the output decision threshold 60, the output decision part 56 outputs a signal indicating that the output of the inflators should be low, to the activation determination part 52.

Namely, in the event of a high-speed collision, the value defined by the operation results $V_5$, $V_n$ varies as indicated by the solid line 600 in FIG. 4. In other words, in the event of the high-speed collision the front sensors 30A, 30B detect large decelerations (or very large deformation occurs in the front part) though the vehicle 46 is not decelerated much, and thus the output decision part 56 outputs the signal indicating that the output of the inflators should be high.

On the other hand, in the event of a low-speed collision, the value defined by the operation results $V_5$, $V_n$ varies as indicated by the dashed line 602 in FIG. 4. In other words, in the event of the low-speed collision the front sensors 30A, 30B do not detect so large decelerations (or deformation of the front part is small) even when the vehicle 46 is decelerated to some extent, and thus the output decision part 56 outputs the signal indicating that the output of the inflators should be low.

Figure 5:
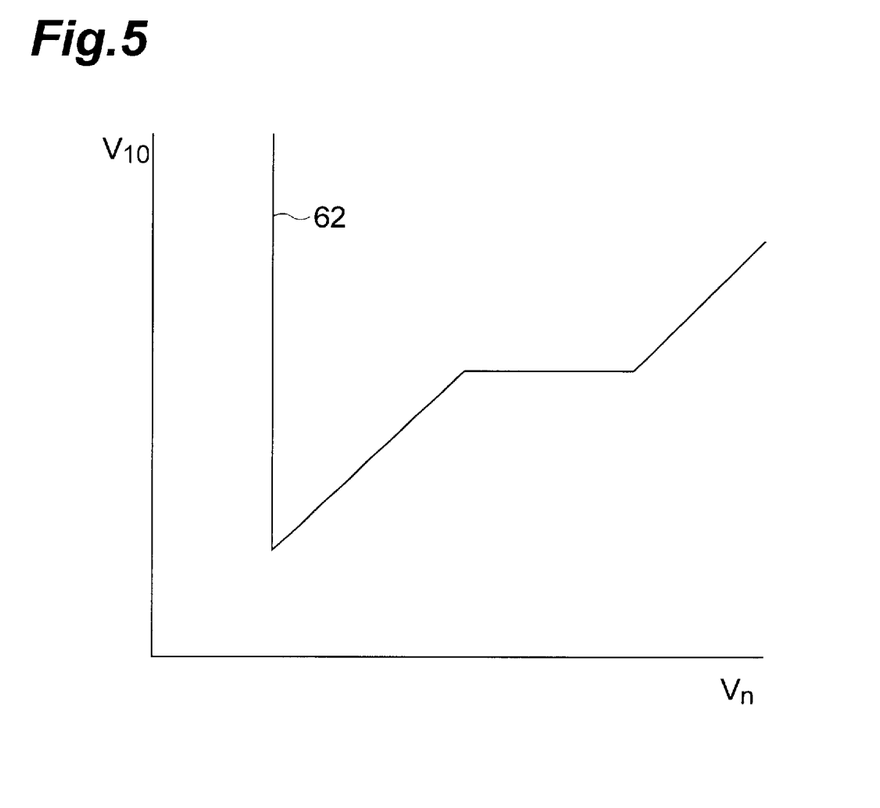
FIG. 5 is a diagram to show an activation determination map used in the activation control apparatus of the airbag system according to the first embodiment.

The activation determination part 52 compares a value defined by the operation results $V_{10}$, $V_n$ with a threshold 62 of a determination map stored in the activation determination part 52. Namely, the activation determination part 52 stores the determination map having the threshold 62 as illustrated in FIG. 5. This determination map is a plot of the operation result $V_n$ on the axis of abscissas and the operation result $V_{10}$ on the axis of ordinates.

Therefore, the activation determination part 52 compares the value defined by the operation results $V_{10}$, $V_n$ obtained by the operation part 50, with the threshold 62 and outputs the activation signal A to the driving circuit 34 (see FIG. 1) when the value defined by the operation results $V_{10}$, $V_n$ is over the threshold 62. The activation signal A includes a signal indicating the output of the inflators determined by the output decision part 56.

When the driving circuit 34 receives the activation signal A including the signal of making the output of the inflators high, it energizes the squibs 38A and 38B to fire the gas generator (not illustrated) by the squibs 38A and 38B. On the other hand, when receiving the activation signal A including the signal of making the output of the inflators low, the driving circuit 34 energizes the squib 38A to fire the gas generator by only the squib 38A.

Since the activation control apparatus of the occupant safety system according to the first embodiment is constructed to determine severity of collision, based on the values detected by the front sensors 30A, 30B and the value detected by the floor sensor 32, it can determine the severity of collision in the early stage and with accuracy and can activate the airbag system 36 at the optimal output according to the severity of collision.

Next, the activation control apparatus of the airbag system according to the second embodiment of the present invention will be described by reference to FIG. 6 and FIG. 7. Since the activation control apparatus of the airbag system according to the second embodiment has almost the same structure as the activation control apparatus of the airbag system according to the first embodiment, the apparatus will be described using the reference symbols assigned to the respective components of the activation control apparatus 2 of the airbag system according to the first embodiment (see FIG. 1).

Figure 6:
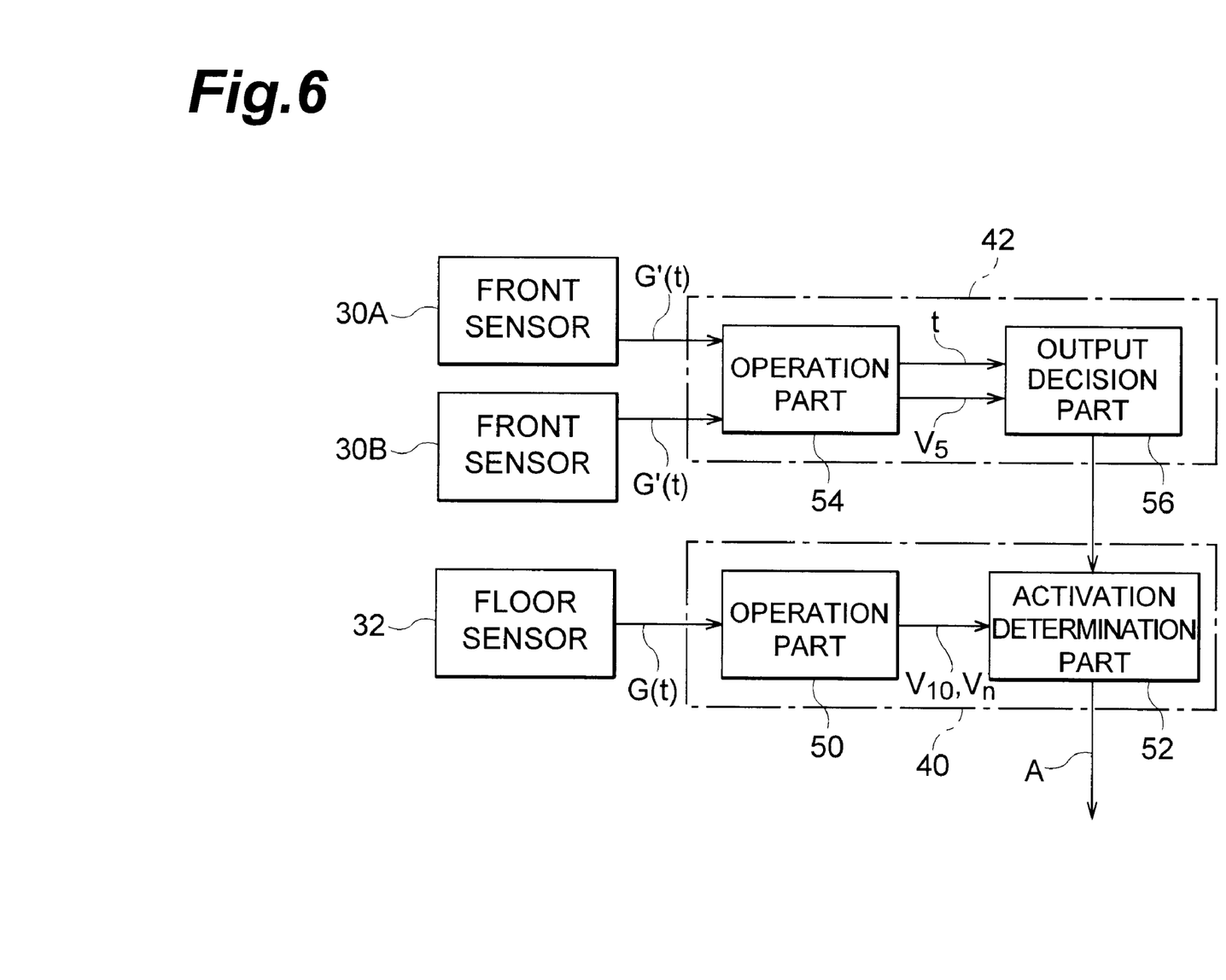
FIG. 6 is a detailed block diagram of the activation control and output control in the activation control apparatus of the airbag system according to the second embodiment.

As illustrated in FIG. 6, the output control 42 according to the second embodiment has the operation part 54 and the output decision part 56. Each of the front sensors 30A, 30B outputs the signal G'(t) corresponding to their detecting value (deceleration). The operation part 54 of the output control 42 determines that a collision occurred on the vehicle 46, when the value (deceleration) G'(t) detected by the front sensor 30A or 30B is over a predetermined value;

i.e., it detects the time of the collision, and then measures the time from the time of the collision. The time t from the time of the collision, thus measured, is supplied to the output decision part 56. The greater out of the operation result $V_5$ based on the deceleration G'(t) outputted from the front sensor 30A and the operation result $V_5$ based on the deceleration G'(t) outputted from the front sensor 30B, which are obtained in the operation part 54, is supplied to the output decision part 56.

The output decision part 56 stores the output decision map having the output decision threshold 64 as illustrated in FIG. 7. This output decision map is a plot of the time t from the time of the collision on the axis of abscissas and the operation result $V_5$ on the axis of ordinates. The output decision part 56 compares a value defined by the operation result $V_5$ and the time t from the time of the collision with the output decision threshold 64 of the output decision map and outputs the signal indicating that the output of the inflators should be high, to the activation determination part 52 when the value defined by the operation result $V_5$ and the time t from the time of the collision is over the output decision threshold 64. When the value defined by the operation result $V_5$ and the time t from the time of the collision is not over the output decision threshold 64, the output decision part 56 outputs the signal indicating that the output of the inflators should be low, to the activation determination part 52.

Namely, in the event of the high-speed collision, the value defined by the operation results $V_5$, and the time t varies as indicated by the solid line 640 in FIG. 7. Thus the output decision part 56 outputs the signal indicating that the output of the inflators should be high. In the event of the low-speed collision, the value defined by the operation results $V_5$, and the time t varies as indicated by the dashed line 642 in FIG. 7. Thus the output decision part 56 outputs the signal indicating that the output of the inflators should be low.

The activation determination part 52 compares the value defined by the operation results $V_{10}$, $V_n$ with the threshold 62 of the determination map stored in the activation determination part 52 (see FIG. 5). Accordingly, the activation determination part 52 compares the value defined by the operation results $V_{10}$, $V_n$ obtained in the operation part 50 with the threshold 62 and outputs the activation signal A to the driving circuit 34 (see FIG. 1) when the value defined by the operation results $V_{10}$, $V_n$ is over the threshold 62. The activation signal A includes the signal indicating the output of the inflators determined by the output decision part 56.

When receiving the activation signal A including the signal of making the output of the inflators high, the driving circuit 34 energizes the squibs 38A and 38B to fire the gas generator (not illustrated) by the squibs 38A and 38B. On the other hand, when receiving the activation signal A including the signal of making the output of the inflators low, the driving circuit 34 energizes the squib 38A to fire the gas generator by only the squib 38A.

Since the activation control apparatus of the occupant safety system according to the second embodiment is constructed to determine the severity of collision, based on the values detected by the front sensors 30A, 30B and the time t from the time of the collision, the apparatus can determine the severity of collision with accuracy and can activate the airbag system 36 at the optimal output according to the severity of collision.

Next, the activation control apparatus of the airbag system according to the third embodiment of the present invention will be described by reference to Figs. BA and 8B. Since the activation control apparatus of the airbag system according to the third embodiment has almost the same structure as the activation control apparatus of the airbag system according to the first embodiment, the apparatus will be described using the reference symbols assigned to the respective components of the activation control apparatus 2 of the airbag system according to the first embodiment (see FIG. 1 and FIG. 3).

The output control 42 according to the third embodiment has the operation part 54 and the output decision part 56. Each of the front sensors 30A, 30B outputs the signal G'(t) corresponding to their detecting value (deceleration). The operation part 54 of the output control 42 executes the predetermined operation with each of the decelerations G'(t) outputted from the front sensors 30A, 30B, i.e., the operation according to Eq. 3, thereby obtaining the operation result $V_5$.

Here the operation result $V_5$ based on the deceleration G'(t) outputted from the front sensor 30A and the operation result $V_5$ based on the deceleration G'(t) outputted from the front sensor 30B are supplied to the output decision part 56. The operation result $V_n$ obtained by the operation part 50 of the activation control 40 is also supplied to the output decision part 56.

The output decision part 56 stores the output decision map having output thresholds 66, 68 as illustrated in FIGS. 8A and 8B. This output decision map is a plot of the operation result $V_n$ on the axis of abscissas and the operation result $V_5$ on the axis of ordinates. The output decision part 56 compares a value defined by the operation result $V_n$ and the operation result $V_5$ based on the deceleration detected by the front sensor 30A with the output decision thresholds 66, 68 of the output decision map and determines whether the value defined by the operation results $V_5$ and $V_n$ is over the output decision threshold 66. The decision part 56 also compares a value defined by the operation result $V_n$ and the operation result $V_5$ based on the deceleration detected by the front sensor 30B with the output decision thresholds 66, 68 and determines whether the value defined by the operation results $V_5$ and $V_n$ is over the output decision threshold 66. When the both values are over the threshold 66, the decision part 56 determines that a high-speed frontal collision occurred, and then outputs the signal indicating that the output of the inflators should be high, to the activation determination part 52. Namely, in the event that the high-speed frontal collision occurs, the both of the values defined by the operation results $V_5$ and $V_n$ exceed the output decision threshold 66 as indicated by the thick solid lines 660 in FIGS. 8A and 8B. Therefore, the decision part can determine on this occasion that the high-speed frontal collision occurred.

When the output decision part 56 compares the value defined by the operation results $V_n$ and $V_5$ based on the deceleration detected by the front sensor 30A with the output decision thresholds 66, 68 of the output decision map and finds that the value defined by the operation results $V_5$ and $V_n$ is over the output decision threshold 68 but not over the threshold 66 and when the output decision part 56 compares the value defined by the operation results $V_n$ and $V_5$ based on the deceleration detected by the front sensor 30B with the output decision thresholds 66, 68 and finds that the value defined by the operation results $V_5$ and $V_n$ is over the output decision threshold 68 but not over the threshold 66, it determines that a low-speed frontal crash occurred, and then outputs the signal of making the output of the inflators low to the activation determination part 52. Namely, in the event that the low-speed frontal crash occurs, the both of the values defined by the operation results $V_5$ and $V_n$ are over the output decision threshold 68 but not over the threshold 66, as indicated by the thin solid lines 662 in FIGS. 8A and 8B, and thus the decision part can determine that the low-speed frontal collision occurred.

Further, when the output decision part 56 compares the value defined by the operation results $V_n$ and $V_5$ based on the deceleration detected by the front sensor 30A and the value defined by the operation results $V_n$ and $V_5$ based on the deceleration detected by the front sensor 30B with the output decision thresholds 66, 68 of the output decision map and finds that one of these values exceeds the output decision threshold 68 (on the collision side of the vehicle) and that the other does not exceed the threshold 68 (on the non collision side of the vehicle), the output decision part 56 determines that a high-speed ODB collision (an irregular collision against a soft obstacle) occurred, and outputs the signal indicating that the output of the inflators should be high, to the activation determination part 52. Namely, in the even that the high-speed ODB collision occurs, one of the values defined by the operation results $V_5$ and $V_n$ is over the output decision threshold 68 as indicated by the dashed line 664 in FIG. 8A, while the other is not over the output decision threshold 68 as indicated by the dashed line 666 in FIG. 8B. Then the output decision part 56 determines that the high-speed ODB collision occurred.

The activation determination part 52 compares the value defined by the operation results $V_{10}$, $V_n$ with the threshold 62 of the determination map stored in the activation determination part 52 (see FIG. 5). Therefore, the activation determination part 52 compares the value defined by the operation results $V_{10}$, $V_n$ computed in the operation part 50, with the threshold 62, and the activation determination part 52 outputs the activation signal A to the driving circuit 34 (see FIG. 1) when the value defined by the operation results $V_{10}$, $V_n$ is over the threshold 62. The activation signal A includes the signal indicating the output of the inflators determined by the output decision part 56.

When receiving the activation signal A including the signal of making the output of the inflators high, the driving circuit 34 energizes the squibs 38A and 38B to fire the gas generator (not illustrated) by the squibs 38A and 38B. On the other hand, when receiving the activation signal A including the signal of making the output of the inflators low, the driving circuit 34 energizes the squib 38A to fire the gas generator by only the squib 38A.

Since the activation control apparatus of the occupant safety system according to the third embodiment is constructed to determine the type of collision, based on the values detected by the front sensors 30A, 30B and the value detected by the floor sensor 32, it can determine the type of collision with accuracy and can activate the airbag system 36 at the optimal output according to the type of collision.

Figure 9:
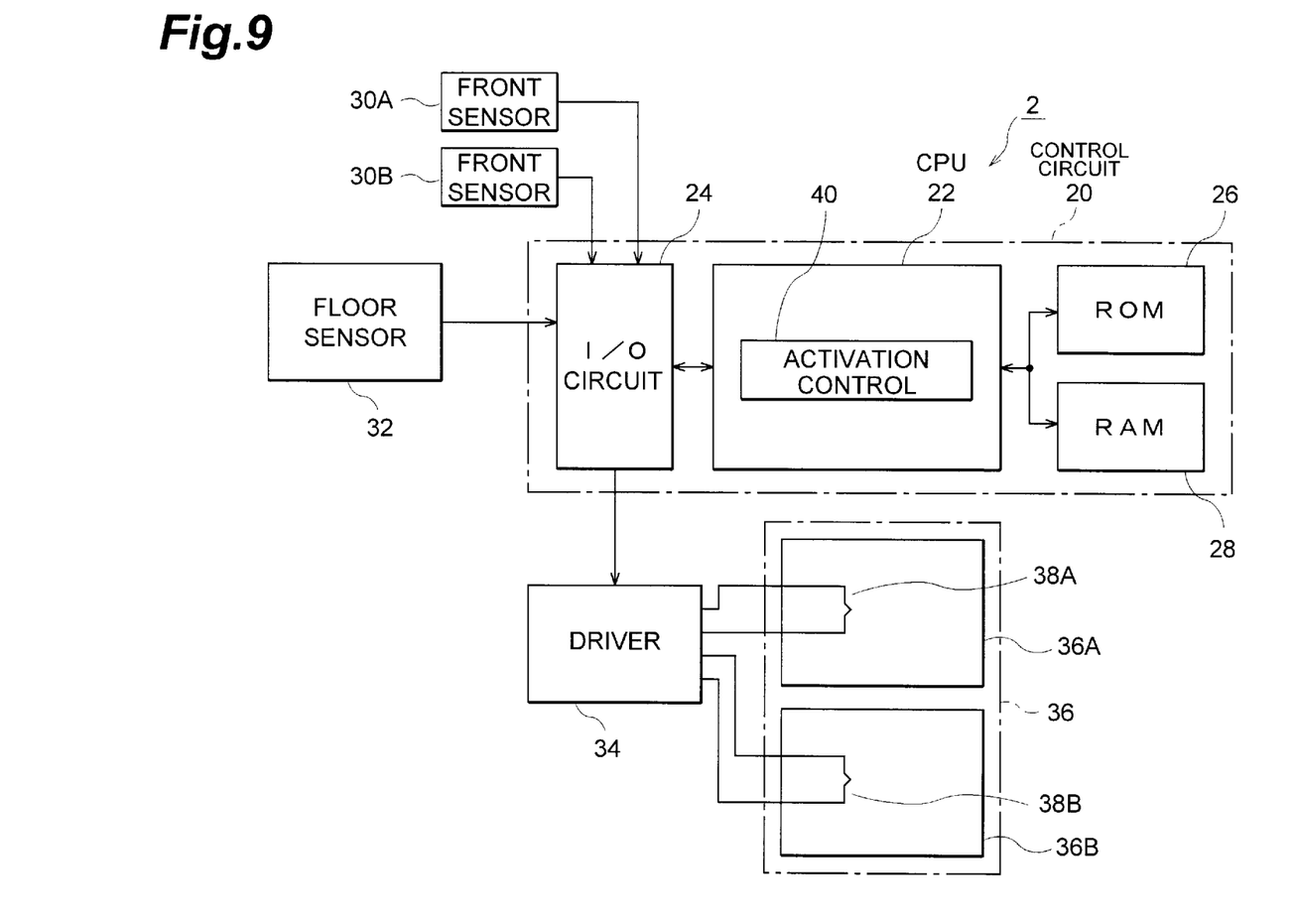
FIG. 9 is a block structural diagram of the activation control apparatus of the airbag system according to the fourth embodiment.
Figure 10:
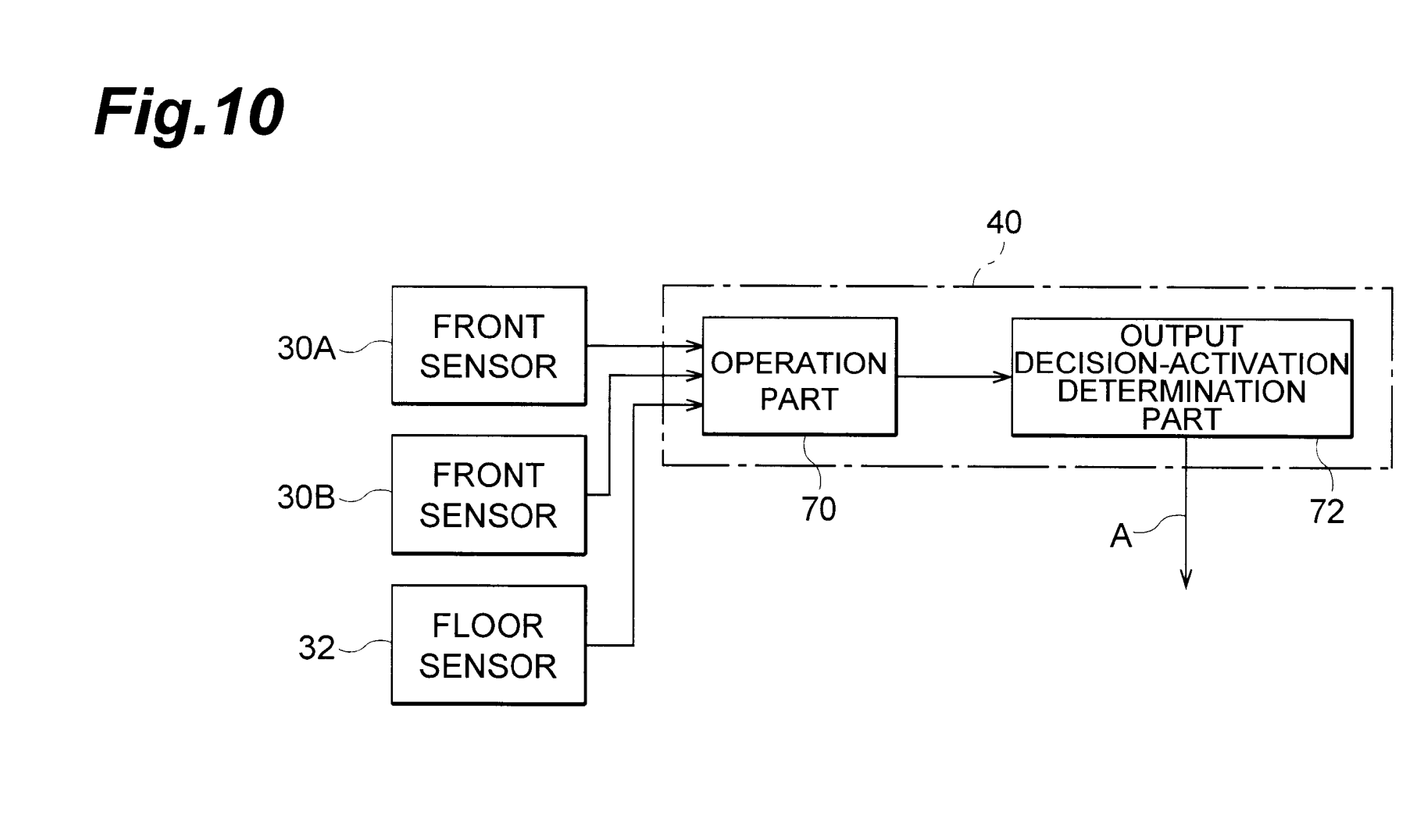
FIG. 10 is a detailed block diagram of the activation control in the activation control apparatus of the airbag system according to the fourth embodiment.

Next, the activation control apparatus of the airbag system according to the fourth embodiment of the present invention will be described by reference to FIG. 9 to FIG. 11. The control apparatus of the airbag system according to the fourth embodiment has almost the same structure as the control apparatus of the airbag system according to the first embodiment (see FIG. 1), but is different in that the apparatus of the present embodiment does not have the output control 42, as illustrated in FIG. 9.

The activation control 40 of the activation control apparatus of the airbag system has the operation part 70 and an output decision-activation determination part 72. Each of the front sensors 30A, 30B outputs the signal G'(t) corresponding to their detecting value (deceleration). The operation part 70 executes the predetermined operation with each of the decelerations G'(t) outputted from the front sensors 30A, 30B, i.e., the operation according to Eq. 3, thereby obtaining the operation result $V_5$. Here the larger out of the operation result $V_5$ based on the deceleration G'(t) outputted from the front sensor 30A and the operation result $V_5$ based on the deceleration G'(t) outputted from the front sensor 30B is supplied to the output decision-activation determination part 72.

The operation part 70 also executes the predetermined operation with the deceleration G(t) outputted from the floor sensor 32, i.e., the operation according to Eq. 2, thereby obtaining the operation result $V_n$. This operation result $V_n$ is supplied to the output decision-activation determination part 72.

The output decision-activation determination part 70 stores a map having output decision-activation determination thresholds 74, 76 as illustrated in FIG. 11. This map is a plot of the operation result $V_n$ on the axis of abscissas and the operation result $V_5$ on the axis of ordinates. The output decision-activation determination part 70 compares a value defined by the operation results $V_n$ and $V_5$ based on the deceleration detected by the front sensor 30A or 30B with the output decision-activation determination thresholds 74, 76 of the map. When the value defined by the operation results $V_5$ and $V_n$ is over the output decision-activation determination threshold 74, the determination part 70 outputs the activation signal for activating the inflators at the high output, to the driving circuit 34.

When the value defined by the operation results $V_5$ and $V_n$ is not over the output decision-activation determination threshold 74 but is over the output decision-activation determination threshold 76, the determination part 70 outputs the activation signal for activating the inflator at the low output, to the driving circuit 34. On the other hand, when the value defined by the operation results $V_5$ and $V_n$ is not over the output decision-activation determination threshold 76, the determination part outputs no activation signal to the driving circuit 34.

This activation control apparatus of the occupant safety system according to the fourth embodiment can perform both the decision of the output of the inflators and the determination of activation of the airbag system with use of only one map stored in the output decision-activation determination part 70.

In the above embodiments the operation result $V_5$ is plotted along the axis of ordinates of the output decision map, but this operation result can be an optimal one selected according to the type of vehicle, for example, such as operation values $V_{10}$, $V_{15}$, and so on.

The output decision part 56 in the first and second embodiments described above or the output decision-activation determination part 72 in the fourth embodiment accepts the larger out of the operation result $V_5$ based on the deceleration G'(t) outputted from the front sensor 30A and the operation result $V_5$ based on the deceleration G'(t) outputted from the front sensor 30B, but the output decision part 56 or the output decision-activation determination part 72 may also be arranged to accept an average of the operation result $V_5$ based on the deceleration G'(t) outputted from the front sensor 30A and the operation result $V_5$ based on the deceleration G'(t) outputted from the front sensor 30B.

In the above embodiments the operation result $V_5$, which is the integral based on the value detected by the front sensor, is plotted along the axis of ordinates of the output decision map, while the operation result $V_n$, which is the integral based on the value detected by the floor sensor, is plotted along the axis of abscissas. It is, however, noted that these operation results are not limited to integrals but a variety of operation results can also be employed.

In the above embodiments the airbag system 36 incorporates the two inflators 36A, 36B and is designed to adjust the ejection power or ejection amount of gas in the two stages (the high output or the low output), but the airbag system 36 may be one equipped with an inflator that permits stepless adjustment of the ejection power or ejection amount of gas and designed to adjust the ejection power or ejection amount of gas to an appropriate value.

According to the present invention, the output control means controls the output value of the inflator on the occasion of activation of the occupant safety system, based on the values detected by the detecting means disposed at the mutually different positions, and thus the occupant safety system can be activated at the optimal output according to the severity of collision.

According to the present invention, since the great impact appears in the initial stage of collision in the event of the high-speed collision, the high-speed collision is judged thereby, and the output of the inflator can be controlled to an appropriate value, based on the judgment result.

According to the present invention, the apparatus can discriminate the low-speed frontal collision from the high-speed irregular collision with accuracy, and can control the output of the inflator, based on the discrimination result.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An activation control apparatus of an occupant safety system for controlling activation of the occupant safety system mounted on a vehicle in the event of the vehicle colliding with an obstacle, said activation control apparatus comprising:

first impact detecting means mounted in the vicinity of a colliding part of said vehicle;

second impact detecting means mounted behind said first impact detecting means in the vehicle; and output control means for controlling an output value of an inflator on the occasion of activation of said occupant safety system, based on values detected by said first-impact detecting means and said second impact detecting means, wherein when an integral of the value detected by said second impact detecting means is in a range smaller than a second predetermined value and when an integral of the value detected by said first impact detecting means is larger than a first predetermined value, said output control means controls the output value of said inflator to a value greater than when the integral of the value detected by said second impact detecting means is in the range smaller than the second predetermined value and when the integral of the value detected by said first impact detecting means is smaller than the first predetermined value.

2. The activation control apparatus according to claim 1, wherein said first detecting means is comprised of left front detecting means mounted in a left front part of said vehicle and right front detecting means mounted in a right front part of the vehicle and wherein said output control means controls the output value of said inflator, based on values detected by said left front detecting means and said right front detecting means.

3. An activation control apparatus of an occupant safety system for controlling activation of the occupant safety system mounted on a vehicle in the event of the vehicle colliding with an obstacle, said activation control apparatus comprising:

first impact detecting means mounted in the vicinity of a colliding part of said vehicle;

second impact detecting means mounted behind said first impact detecting means in the vehicle;

output control means for controlling an output value of an inflator on the occasion of activation of said occupant safety system, based on values detected by said first-impact detecting means and said second impact detecting means; and collision time detecting means for detecting a time of a collision of said vehicle, wherein when a time from the time of the collision detected by said collision time detecting means is in a range shorter than a third predetermined value and when an integral of the value detected by said first impact detecting means is larger than a first predetermined value, said output control means controls the output value of said inflator to a value greater than when the time from the time of the collision dete-cted by said collision time detecting means is in the range shorter than the third predetermined value and when the integral of the value detected by said first impact detecting means is smaller than the first predetermined value.

4. An activation control apparatus of an occupant safety system for controlling activation of the occupant safety system mounted on a vehicle in the event of the vehicle colliding with an obstacle, said activation control apparatus comprising:

first impact detecting means mounted in the vicinity of a colliding part of said vehicle;

second impact detecting means mounted behind said first impact detecting means in the vehicle; and output control means for controlling an output value of an inflator on the occasion of activation of said occupant safety system, based on values detected by said first-impact detecting means and said second impact detecting means, wherein said first detecting means is comprised of left front detecting means mounted in a left front part of said vehicle and right front detecting means mounted in a right front part of the vehicle and wherein when an integral of the value detected by said second impact detecting means is in a range smaller than a second predetermined value and when the larger out of an integral of the value detected by said left front detecting means and an integral of the value detected by said right front detecting means is larger than a first predetermined value, said output control means controls the output value of said inflator to a value greater than when the integral of the value detected by said second impact detecting means is in the range smaller than the second predetermined value and when the larger out of an integral of the value detected by said left front detecting means and an integral of the value detected by said right front detecting means is smaller than the first predetermined value.

5. An activation control apparatus of an occupant safety system for controlling activation of the occupant safety system mounted on a vehicle in the event of the vehicle colliding with an obstacle, said activation control apparatus comprising:

first impact detecting means mounted in the vicinity of a colliding part of said vehicle;

second impact detecting means mounted behind said first impact detecting means in the vehicle;

output control means for controlling an output value of an inflator on the occasion of activation of said occupant safety system, based on values detected by said first-impact detecting means and said second impact detecting means; and collision time detecting means for detecting a time of a collision of said vehicle, wherein said first detecting means is comprised of left front detecting means mounted in a left front part of said vehicle and right front detecting means mounted in a right front part of the vehicle and wherein when a time from the time of the collision detected by said collision time detecting means is in a range shorter than a third predetermined value and when the larger out of an integral of the value detected by said left front detecting means and an integral of the value detected by said right front detecting means is larger than a first predetermined value, said output control means controls the output value of said inflator to a value greater than when the time from the time of the collision detected by said collision time detecting means is in the range shorter than the third predetermined value and when the larger out of an integral of the value detected by said left front detecting means and an integral of the value detected by said right front detecting means is smaller than the first predetermined value.

6. An activation control apparatus of an occupant safety system for controlling activation of the occupant safety system mounted on a vehicle in the event of the vehicle colliding with an obstacle, said activation control apparatus comprising:

left front detecting means mounted in the vicinity of a colliding part in the left front part of said vehicle;

right front detecting means mounted in the vicinity of a colliding part in the right front part of said vehicle;

second impact detecting means mounted behind said left detecting means and said right detecting means in the vehicle; and output control means for controlling an output value of an inflator on the occasion of activation of said occupant safety system, wherein when either one of a value computed based on the value detected by said left front detecting means and the value detected by said second impact detecting means and a value computed based on the value detected by said right front detecting means and the value detected by said second impact detecting means is over a predetermined threshold smaller than said first predetermined value and when the other is not over said predetermined threshold, said output control means controls the output value of said inflator to a value greater than when the both of the value computed based on the value detected by said left front detecting means and the value detected by said second impact detecting means and the value computed based on the value detected by said right front detecting means and the value detected by said second impact detecting means are over said predetermined threshold smaller than said first predetermined value.

7. An activation control apparatus of an occupant safety system for controlling activation of the occupant safety system mounted on a vehicle in the event of the vehicle colliding with an obstacle, said activation control apparatus comprising:

a left electronic sensor mounted in the vicinity of a colliding part in the left front part of said vehicle;

a right electronic sensor mounted in the vicinity of a colliding part in the right front part of said vehicle;

second impact detecting means mounted behind said left electronic sensor and said right electronic sensor in the vehicle; and output control means for controlling an output value of an inflator on the occasion of activation of said occupant safety system, based on values detected by said left electronic sensor, said right electronic sensor and said second impact detecting means, wherein when an integral of the value detected by said second impact detecting means is in a range smaller than a second predetermined value and when the larger out of an integral of the value detected by said left electronic sensor and an integral of the value detected by said right electronic sensor is larger than a first predetermined value, said output control means controls the output value of said inflator to a value greater than when the integral of the value detected by said second impact detecting means is in the range smaller than the second predetermined value and when the larger out of the integral of the value detected by said left electronic sensor and an integral of the value detected by said right electronic sensor is smaller than the first predetermined value.

8. An activation control apparatus of an occupant safety system for controlling activation of the occupant safety system mounted on a vehicle in the event of the vehicle colliding with an obstacle, said activation control apparatus comprising:

a left electronic sensor mounted in the vicinity of a colliding part in the left front part of said vehicle;

a right electronic sensor mounted in the vicinity of a colliding part in the right front part of said vehicle;

second impact detecting means mounted behind said left electronic sensor and said right electronic sensor in the vehicle;

output control means for controlling an output value of an inflator on the occasion of activation of said occupant safety system, based on values detected by said left electronic sensor, said right electronic sensor and said second impact detecting means; and collision time detecting means for detecting a time of a collision of said vehicle, wherein when a time from the time of the collision detected by said collision time detecting means is in a range shorter than a third predetermined value and when the larger out of an integral of the value detected by said left electronic sensor and an integral of the value detected by said right electronic sensor is larger than a first predetermined value, said output control means controls the output value of said inflator to a value greater than when the time from the time of the collision detected by said collision time detecting means is in the range shorter than the third predetermined value and when the larger out of an integral of the value detected by said left electronic sensor and an integral of the value detected by said right electronic sensor is smaller than the first predetermined value.

9. An activation control apparatus of an occupant safety system for controlling activation of the occupant safety system mounted on a vehicle in the event of the vehicle colliding with an obstacle, said activation control apparatus comprising:

a left electronic sensor mounted in the vicinity of a colliding part in the left front part of said vehicle;

a right electronic sensor mounted in the vicinity of a colliding part in the right front part of said vehicle;

second impact detecting means mounted behind said left electronic sensor and said right electronic sensor in the vehicle; and output control means for controlling an output value of an inflator on the occasion of activation of said occupant safety system, wherein when either one of a value computed based on the value detected by said left electronic sensor and the value detected by said second impact detecting means and a value computed based on the value detected by said right electronic sensor and the value detected by said second impact detecting means is over a predetermined threshold smaller than said first predetermined value and when the other is not over said predetermined threshold, said output control means controls the output value of said inflator to a value greater than when the both of the value computed based on the value detected by said left electronic sensor and the value detected by said second impact detecting means and the value computed based on the value detected by said right electronic sensor and the value detected by said second impact detecting means are over said predetermined threshold smaller than said first predetermined value.

10. An activation control apparatus of an occupant safety system for controlling activation of the occupant safety system mounted on a vehicle in the event of the vehicle colliding with an obstacle, said activation control apparatus comprising:

first impact detecting means mounted in the vicinity of a colliding part of said vehicle;

second impact detecting means mounted behind said first impact detecting means in the vehicle; and activation control means for determining whether said occupant safety system should be activated and determining an output value of an inflator on the occasion of activation of said occupant safety system, based on values detected by said first impact detecting means and said second impact detecting means, wherein when a value computed based on the value detected by said first impact detecting means and the value detected by said second impact detecting means is over a first output decision-activation determination threshold, said activation control means controls the output value of said inflator to a value greater than when the value computed based on the value detected by said first impact detecting means and the value detected by said second impact detecting means is not over said first output decision-activation determination threshold but is over a second output decision-activation determination threshold.

11. The activation control apparatus according to claim 10, wherein said first impact detecting means is comprised of an electronic sensor mounted in a left front part of said vehicle and an electronic sensor mounted in a right front part of the vehicle.

* * * * *